April 28, 1925.　　　　　　　　　　　　　　　　　　1,535,768
H. C. DAVIS
FEED WATER GREASE EXTRACTOR APPARATUS
Filed Sept. 15, 1920　　　3 Sheets-Sheet 1

WITNESSES

INVENTOR:
HOWARD C. DAVIS,
BY
ATTORNEY.

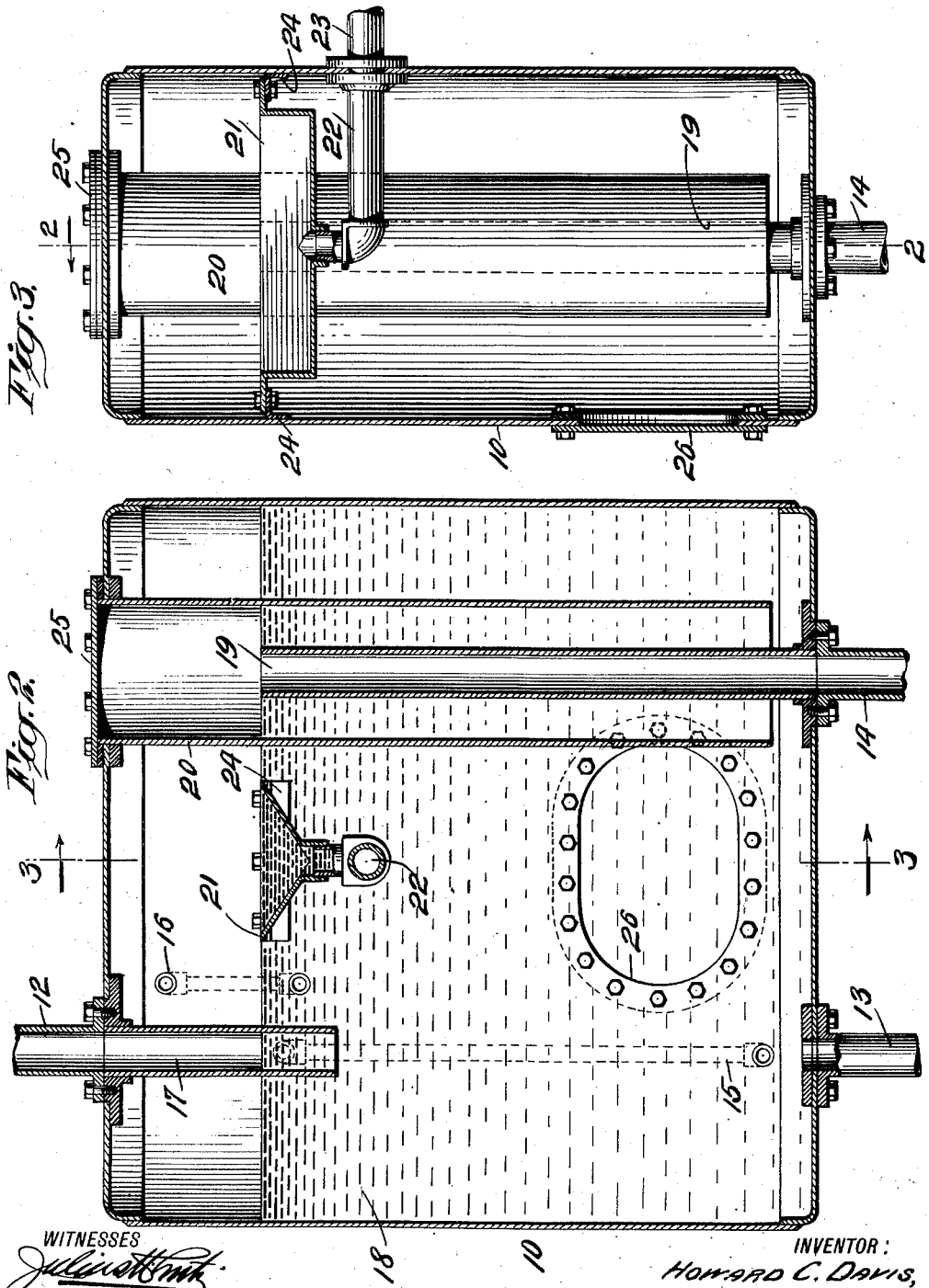

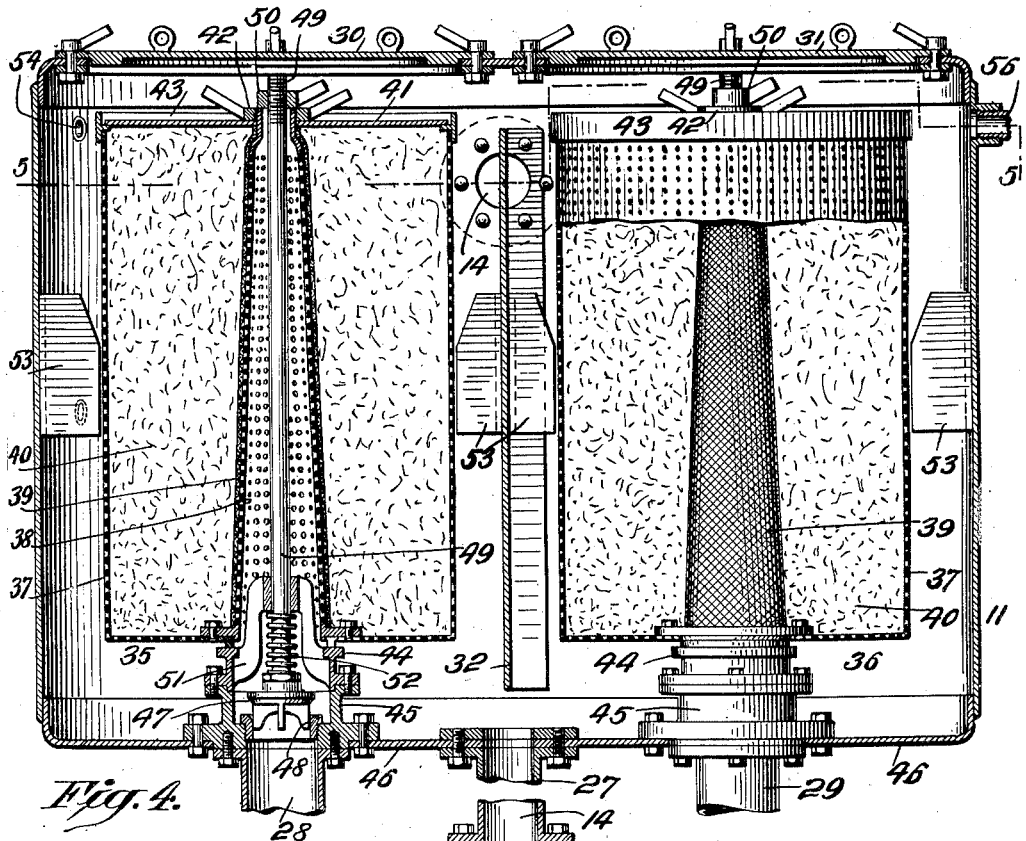
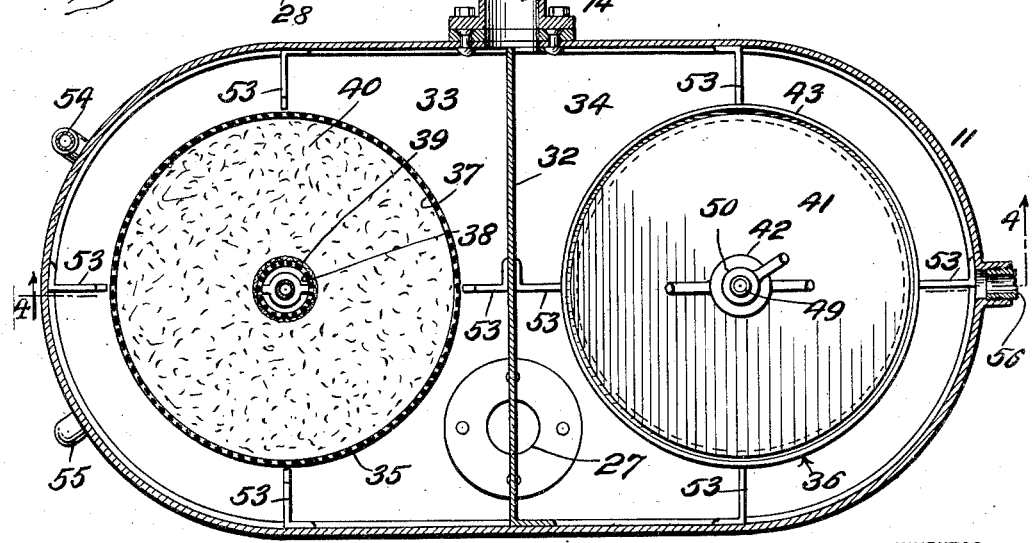

Patented Apr. 28, 1925.

1,535,768

UNITED STATES PATENT OFFICE.

HOWARD C. DAVIS, OF ELIZABETH, NEW JERSEY, ASSIGNOR TO ROW & DAVIS ENGINEERS, INC., OF NEW YORK, N. Y., A CORPORATION OF DELAWARE.

FEED-WATER GREASE-EXTRACTOR APPARATUS.

Application filed September 15, 1920. Serial No. 410,514.

*To all whom it may concern:*

Be it known that I, HOWARD C. DAVIS, a citizen of the United States, and a resident of Elizabeth, in the county of Union and State of New Jersey, have invented certain new and useful Improvements in Feed-Water Grease-Extractor Apparatus, of which the following is a specification.

It is usual on "tank steamers", so called, or oil-carrying vessels, to keep the oil in the tanks at a reasonably warm temperature by means of heater coils placed in the tanks and into and through which coils the exhaust steam from the engines or other source is caused to flow. The exhaust steam and water of condensation flowing through the heater coils become impregnated with oil or grease due to leakage or other defects in the pipes or other joints and rendered, for that reason, unsuitable for use as feed-water for the engine boilers.

One of the main objects of this invention is to extract the grease or oil from the water resulting from the steam employed in the aforesaid heater coils, so that said water may be properly used as feed-water or for other purpose. My invention involves the provision of apparatus into which the return from the aforesaid heater coils is piped and within which the grease is effectually extracted or removed from the water of condensation by mechanical means consituting portions of said apparatus, all exhaust vapor entering said apparatus being condensed therein preparatory to the removal of the grease from the resulting water of condensation. My invention prepares the water for renewed use as feed-water or for other purposes, and said invention, in addition to other details, comprises a receiving and inspection tank receiving the return from the heater coils and within which a large percentage of the grease or oil is removed from the water, a filter tank in communication with the inspection and receiving tank and which receives the water, partly cleansed, therefrom, and filters within said filter tank through which the water flows by gravity to a suitable discharge and which completes the removal of the grease or oil from the water.

The appartus of my invention involves novel features of arrangement, construction and combinations of parts, and said invention will be fully understood from the detailed description hereinafter presented, reference being had to the accompanying drawings, in which:

Fig. 2 is a central vertical section, taken on the dotted line 2—2 of Fig. 1, of the receiving and inspection tank wherein a large percentage of the oil or grease is removed from the water;

Fig. 3 is a vertical section through the same, taken at right angles to the section of Fig. 2 and being on the dotted line 3—3 of Fig. 2;

Fig. 4 is a vertical section, partly broken away, through the filter tank, taken on the dotted line 4—4 of Fig. 1 and being on a larger scale than Fig. 1, and Fig. 5 is a horizontal section through the same, taken on the dotted line 5—5 of Fig. 4.

Figure 1:
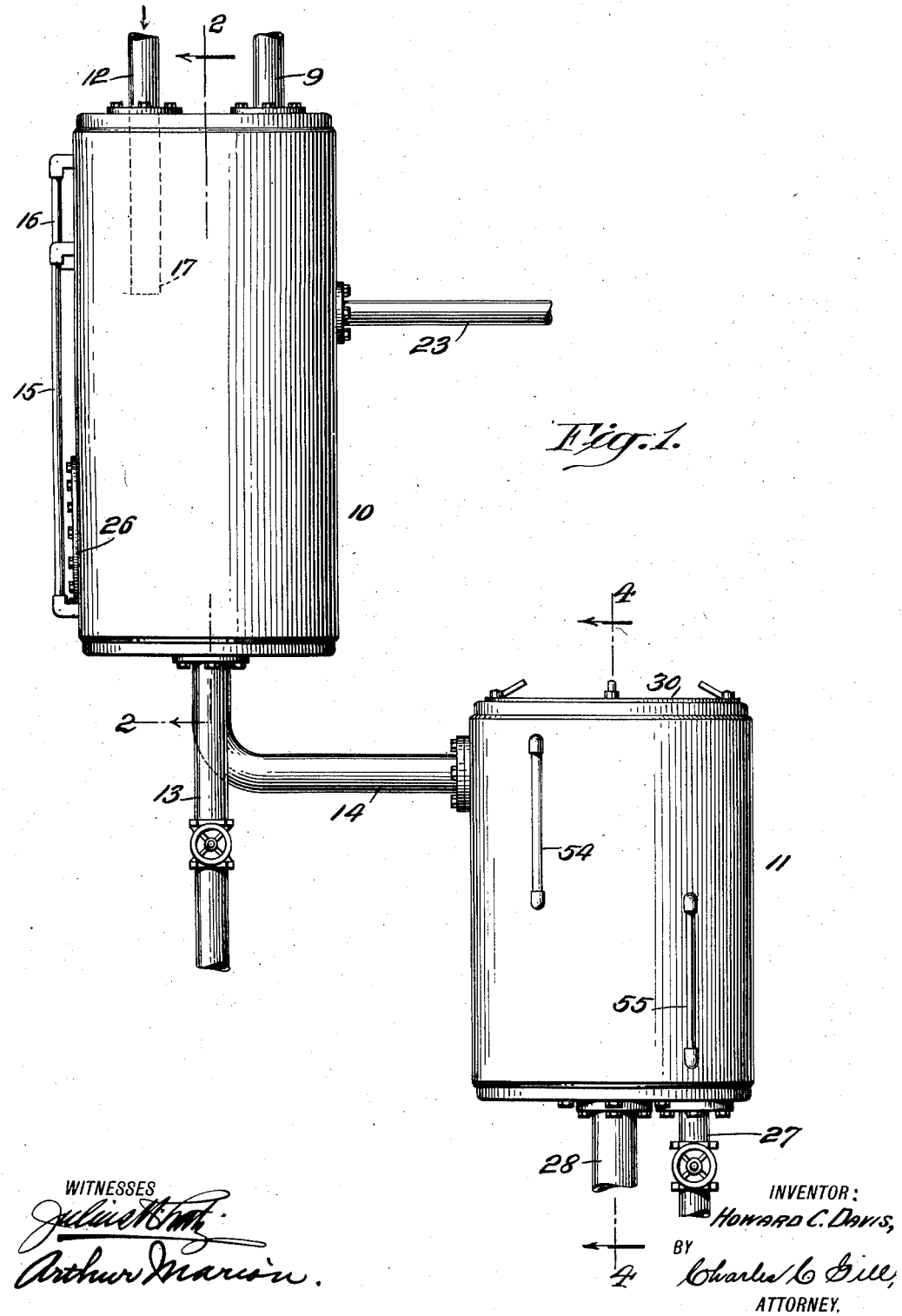
Fig. 1 is a side elevation, with the pipe connections partly broken away, of an apparatus constructed in accordance with and embodying my invention.

In the drawings, 10 designates the inspection and receiving tank, 11 the filter tank, 12 the inlet pipe running from the oil-tank heater coils to the receiving tank 10, 9 a vent from the top of the tank 10, 13 a valved drain-pipe extending from the bottom of the tank 10 and to be used when required for draining said tank, 14 a pipe connecting the receiving tank 10 with the filter tank 11 and serving as the inlet to said filter tank, 15 a gauge glass applied to the tank 10 and extending from just below the water level in said tank to nearly the bottom of the tank, 16 a gauge glass applied to the tank 10 and extending from above the water level therein to a point somewhat below said water level and above the upper end of the gauge glass 15, said gauge glasses being arranged as described and as illustrated in Fig. 2 so as to afford an accurate reading of the oil condition within the tank 10. The return pipe 12 is in communication within the tank 10 with a pipe 17 which is secured to the top of the tank and extends downwardly below the level of the body of water 18 within the tank, as shown in Fig. 2, so that the delivery from the pipe 17 will be into the body of the water 18, this being for the purpose of condensing any exhaust vapor which may discharge from said pipe 17.

Within the tank 10 I provide an outlet stand-pipe 19, a depending casing 20 enclosing said pipe to nearly its lower end and a scum pan 21, which will preferably be of V-shape in vertical cross-section and have outlet pipe connections 22 communicating with an exterior discharge pipe 23 which may lead to any suitable location for the disposal of the discharge therefrom. The scum pan 21 extends transversely across the tank 10 at the water level therein and between the inlet pipe 17 and casing 20, as shown in Figs. 2 and 3, and said pan is removably supported upon angle iron brackets 24 secured to the inner opposite sides of the tank 10. The scum pan 21 performs the very important function of receiving the supernatant oil or grease from the water within the tank 10 and discharging the same through the pipe connections 22, 23, this resulting in a large percentage of the oil or grease entrained in the exhaust steam and water of condensation, being carried away preliminarily to the further treatment of the water within the filter tank 11. The water level within the tank 10 is maintained by the outlet pipe 19 which extends upwardly from the bottom of the tank to a point in horizontal alignment with the upper edge of the scum pan 21, and hence with the additions of water to the tank 10, accumulating during the use of the apparatus, the proper water level will be maintained in the tank 10 and a large portion of the oil or grease ascending through the water will flow into the scum pan 21 and be discharged from the apparatus. The outlet pipe 19 is in communication with the pipe 14 leading to the filter tank, and said pipe 19 is within the depending cylindrical casing 20 which extends downwardly from the top of the tank 10 to near the bottom thereof. The accumulations of water within the tank 10 must ascend through the casing 20 and around the outside of the pipe 19 and overflow into said pipe, passing thence through the pipe 14 to the filter tank. The function of the casing or outer pipe 20 is to trap the oil in the inspection tank 10 so that said oil shall rise to the scum pan level and enter said pan to be discharged through the pipe connections 22, 23.

The tank 10 is equipped with a suitable manhole 26 to permit easy access thereto, when necessary, and above the casing 20 is a removable cover 25.

The inspection tank 10 prepares the water for treatment in the filter tank 11 and should be located sufficiently high to permit the discharge through the pipe 14 to flow by gravity to said tank 11 for final filtration.

The tank 11 has a drain outlet 27, two delivery pipes 28, 29 for filtered water, two large removable covers 30, 31 at its top and a central vertical partition plate 32 which extends upwardly from near the bottom of the tank to near the top thereof, as shown in Fig. 4, said partition plate being carried across the inlet 14 and subdividing the same into two inlets, one being at each side of the partition 32 and near the top of the tank. The partition 32 subdivides the chamber of the tank 11 into two compartments, which I number, in Fig. 5, 33, 34, respectively, and both of these compartments receive water from the inlet pipe 14, as will be apparent from an examination of Figs. 4 and 5. Within each of the compartments 33, 34 I provide a filter through which the water entering the compartments will pass by gravity and finally be discharged to the delivery pipes 28, 29. I number the filters as a whole 35, 36, respectively, and these filters are of corresponding construction and each comprises an outer perforated shell or container 37, an inner hollow perforated composition metal cone or core 38, a covering of fine mesh wire gauze 39 covering said cone and a filling 40 of cocoanut fibre within the container 37, cocoanut fibre being preferably employed as the filtering media on account of its high affinity for oil. The container 37 is of such size that the outside strata of cocoanut fibre therein equals over three hundred times the area of the inlet for water thereto. The fine mesh wire gauze 39 covering the cone 38 is to prevent any fibre from passing through the cone with the filtered water. The cone 38 is bolted upon the bottom of the container 37 above a large central opening therein, and said cone extends upwardly through the top plate 41 of the container and receives a nut 42 by which the top plate 41 may be clamped on a seat therefor afforded by a band 43 which extends around the top of and is secured to the side of the container 37. The container 37 is seated upon a top housing 44 which is bolted to a lower housing 45 bolted to the bottom 46 of the tank 11. The housings 44, 45 are provided for a check-valve 47 which is adapted to a valve-seat 48, and said housings are in direct communication with the delivery pipes 28, 29 for filtered water. The check-valve 47 is secured upon the lower end of a valve stem or rod 49 which extends upwardly centrally through the cone 38 and at its upper end, which is threaded, projects above said cone and receives a handle nut 50. The lower portion of the valve stem or rod 49 extends through a guiding spider frame 51 and between said frame and the valve 47 is confined a spring 52 which presses downwardly against the valve 47 and when permitted so to do closes said valve upon its seat 48. In the normal operative condition of the apparatus, the valve 47 is held in its open position, as shown in Fig. 4, against the stress of the spring 52, said valve thus being held in its open position by the nut 50 and upper threaded end of the rod 49. The compression of the spring 52 by means of the nut 50, in its engagement with the upper threaded end of the rod 49, serves to clamp the container 37 upon the upper housing 44. When it may be desired to remove the container 37 from the tank 11, either for renewing the filtering media 40 or for other cause, the nut 50 will be slacked off from the valve stem or rod 49 and thereupon the container 37 and its connected parts may be lifted out through the top of the tank, the cover-plate above the container having been removed to permit that result. The removal of the handle nut 50 from the valve stem or rod 49 results in the spring 52 being left unrestrained and in said spring, by its expansive force, closing the valve 47, thereby cutting off the escape of unfiltered water from the tank. Whenever one container 37 is removed from the tank 11, the other filter may continue in operation, or at any time either filter may be cut out of operation by allowing the check valve 47 to descend upon its seat 48. A spare container 37 filled with the cocoanut fibre 40 should be carried in stock so that it may be quickly installed in the tank 11 whenever it might be necessary to remove either one of the containers therein for refilling with fibre or for other purpose. The containers 37 forming parts of the two filtering apparatuses present in the tank 11 may be centered upon their respective seats and aided in maintaining their respective positions by means of plates 53 secured to the inner walls of the tank and at their inner edges engaging the exterior surfaces of said containers.

The tank 11 will be provided with suitable gauge glasses 54, 55 for indicating the oil condition of the water within the tank 11 and consequently the condition of the beds of filtering material. The tank 11 also is provided with an overflow pipe 56 adjacent to the upper end thereof.

The operation of the apparatus will be understood from the foregoing description without further extended explanation. The return from the heater coils located in the oil tanks leads to the inlet pipe 17 in the tank 10, and said tank 10 may be either primarily filled with water or derive its water from condensation of the exhaust vapor. A body of water 18 is maintained constantly in the tank 10, and the inlet pipe 17 extends downwardly below the water level, as shown in Fig. 2. The water level is maintained in the tank 10 by the presence of the outlet stand-pipe 19, and the accumulations of water within the tank 10 causes an overflow into the scum pan 21 into which the supernatant oil or grease will pass and from which the same will be discharged through the pipe connections 22, 23. The casing 20 traps the oil within that portion of the compartment wherein the scum pan 21 is located, and hence the tank 10 and its parts may operate with maximum efficiency in removing a large percentage of oil or grease from the water preparatory to the water being further treated in the tank 11. The water, partially cleansed, flows from the stand-pipe 19 through the pipe 14 and enters the tank 11 at both sides of the partition 32 therein, and said water passes through the filters 35, 36 and is discharged through the delivery pipes 28, 29, whence the water will be led to a suitable reservoir tank or reservoir tanks therefor ready for use as feed water or for other purpose. It is desirable that the compartments 33, 34 of the tank 11 should be in communication with each other, though partly separated by the partition plate 32, since thereby the apparatus may be kept in operation, even though one of the filters becomes foul or has been removed. The construction is such that either or both filters may be kept in operation, and the filters themselves are of such special nature as to afford maximum efficiency in an appartus of the character made the subject of this application.

What I claim as my invention and desire to secure by Letters Patent, is—

1. Unitary apparatus of the character described for use on a tank-steamship comprising a receiving tank for holding a body of water at a substantially uniform level and having an inlet for steam and water of condensation leading into said tank below the water level therein and a gravity discharge leading from the lower portion of the tank, said receiving tank also having means for the automatic discharge of oil from the upper surface of the water and means for maintaining the water at a substantially uniform predetermined level, a filter tank having an inlet through which said gravity discharge delivers into the filter tank from said receiving tank, spaced-apart self-contained removable unit filters submerged in said filter tank for filtering the water therein and having valved outlets leading therefrom for filtered water and adapted to permit either or both filters to remain in operation, and removable cover-plates at the top of said filter tank over said filters to provide for the introduction of the filters and the removal of either or both thereof.

2. Unitary apparatus of the character described for use on a tank-steamship comprising a receiving tank for holding a body of water at a substantially uniform level and having an inlet for steam and water of condensation leading into said tank below the water level therein and a gravity discharge leading from the lower portion of the tank, said receiving tank also having means for the automatic discharge of oil from the upper surface of the water and means for maintaining the water at a substantially uniform predetermined level, a filter tank having an inlet through which said gravity discharge delivers into the filter tank from said receiving tank, spaced-apart self-contained removable unit filters submerged in said filter tank for filtering the water therein and having valved outlets leading therefrom for filtered water and adapted to permit either or both filters to remain in operation, and removable cover plates at the top of said filter tank over said filters to provide for the introduction of the filters and the removal of either or both thereof, said filters each comprising a vertical hollow core connected with the valved outlet, an exterior perforated container and a filling of filtering media within said container exterior to said core.

3. Unitary apparatus of the character described for use on a tank-steamship comprising a receiving tank for holding a body of water at a substantially uniform level and having an inlet for steam and water of condensation leading into said tank below the water level therein and a gravity discharge pipe leading from the lower portion of the tank, said receiving tank also having means for the automatic discharge of oil from the upper surface of the water and means for maintaining the water at a substantially uniform predetermined level, a filter tank subdivided into two substantially equal chambers by a vertical partition plate below which said chambers communicate with each other and which filter tank has at its upper portion an inlet to which said gravity discharge pipe leads and through which said pipe discharges into both of said chambers in substantially equal volumes, self-contained removable unit filters submerged in both of said chambers for filtering the water therein and having valved outlets leading therefrom for filtered water, and removable cover plates at the top of said filter tank over said filters to provide for the introduction and removal of either or both thereof.

Signed at New York city, in the county of New York and State of New York, this 7th day of September, A. D. 1920.

HOWARD C. DAVIS.